US006924431B1

(12) United States Patent
Ofcharsky et al.

(10) Patent No.: US 6,924,431 B1
(45) Date of Patent: *Aug. 2, 2005

(54) PREPACKAGED MOUNTING ASSEMBLY (75) Inventors: John Ofcharsky, Olyphant, PA (US); Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 24 days.

This patent is subject to a terminal disclaimer.

(21) Appl. No.: 10/945,476

(22) Filed: Sep. 20, 2004

Related U.S. Application Data (63) Continuation of application No. 10/790,973, filed on Mar. 2, 2004, now Pat. No. 6,794,573, which is a continuation-in-part of application No. 10/723,122, filed on Nov. 26, 2003, now Pat. No. 6,777,615, which is a continuation-in-part of application No. 10/464,334, filed on Jun. 18, 2003, now Pat. No. 6,734,356, which is a continuation-in-part of application No. 10/361,292, filed on Feb. 10, 2003, now Pat. No. 6,632,998, which is a continuation-in-part of application No. 10/287,088, filed on Nov. 4, 2002, now Pat. No. 6,646,201, which is a continuation-in-part of application No. 10/012,584, filed on Nov. 7, 2001, now Pat. No. 6,509,524, and a continuation-in-part of application No. 10/017,571, filed on Oct. 22, 2001, now Pat. No. 6,677,523, which is a continuation-in-part of application No. 09/784,981, filed on Feb. 16, 2001, now Pat. No. 6,355,883, and a continuation-in-part of application No. 09/373,431, filed on Aug. 13, 1999, now Pat. No. 6,191,362.

(51) Int. Cl.[7] .............................................. H01H 9/02
(52) U.S. Cl. ......................... 174/58; 174/53; 174/135; 220/3.3
(58) Field of Search ........................... 174/58, 53, 135, 174/50, 63, 17 R, 60; 220/3.3, 3.9, 3.8, 4.02; 439/535; 248/906

(56) References Cited

U.S. PATENT DOCUMENTS

| | | | | |
|---|---|---|---|---|
| 3,846,604 A | * | 11/1974 | Shallbetter | 200/297 |
| 4,399,922 A | * | 8/1983 | Horsley | 220/3.6 |
| 4,483,453 A | * | 11/1984 | Smolik | 220/3.5 |
| 4,572,391 A | * | 2/1986 | Medlin | 220/3.9 |
| 4,688,693 A | * | 8/1987 | Medlin, Jr. | 220/3.9 |
| 5,646,371 A | * | 7/1997 | Fabian | 174/58 |
| 5,693,909 A | * | 12/1997 | McEwen | 174/58 |
| 6,147,306 A | * | 11/2000 | Wilkins | 174/58 |
| 6,323,424 B1 | * | 11/2001 | He | 174/58 |
| 6,509,524 B1 | * | 1/2003 | Gretz | 174/50 |

* cited by examiner

Primary Examiner—Dhiru R. Patel (57) ABSTRACT

A prepackaged mounting assembly for securing a device, such as a ceiling fan, light fixture, or similar device to an overhead beam. The mounting assembly includes an L-shaped mounting box that includes a large side wiring cavity and an integral flange portion. A cover cooperates with the integral flange portion to provide a closure for the wiring cavity and a bottom flange for mounting a device-specific bracket thereon. The bracket includes slots therein and the integral flange portion includes downward extending alignment posts to enable easy centering of the manufacturer's bracket under the integral flange. The mounting assembly includes all hardware required to complete installation of the device including the cover, an initial fastener, and load bearing fasteners, which are all temporarily secured to the L-shaped box.

1 Claim, 6 Drawing Sheets

PREPACKAGED MOUNTING ASSEMBLY

This application is a Continuation of U.S. patent application Ser. No. 10/790,973 entitled Prepackaged Mounting Assembly, filed Mar. 2, 2004, now U.S. Pat. No. 6,794,573 which is a Continuation-In-Part of U.S. patent application Ser. No. 10/723,122 entitled Fan Rated Junction Box Assembly, filed Nov. 26, 2003, now U.S. Pat. No. 6,777,615, which is a Continuation-In-Part of U.S. patent application Ser. No. 10/464,334 entitled Prepackaged Mounting Assembly and Bracket Combination, filed Jun. 18, 2003, now U.S. Pat. No. 6,734,356, which is a Continuation-In-Part of Ser. No. 10/361,292 entitled "Prepackaged Mounting Assembly with Holstered Screws", filed Feb. 10, 2003 now U.S. Pat. No. 6,632,998, which is a Continuation-In-Part of U.S. patent application Ser. No. 10/287,088 entitled "Prepackaged Mounting Assembly", filed Nov. 4, 2002 now U.S. Pat. No. 6,646,201, which is a Continuation-In-Part of U.S. patent application Ser. No. 10/012,584 entitled "Prepackaged Mounting Assembly", filed Nov. 7, 2001, now U.S. Pat. No. 6,509,524, and is a Continuation-In-Part of U.S. patent application Ser. No. 10/017,571 entitled "Electrical Fixture Mounting Box and Mounting Assembly", filed Oct. 22, 2001, now U.S. Pat. No. 6,677,523, which is a Continuation-In-Part of U.S. patent application Ser. No. 09/784,981 entitled "Electrical Fixture Mounting Box and Mounting Assembly", filed Feb. 16, 2001, now U.S. Pat. No. 6,355,883, and is a Continuation-In-Part of U.S. patent application Ser. No. 09/373,431 entitled "Electrical Fixture Mounting Box", filed Aug. 13, 1999, now U.S. Pat. No. 6,191,362, of which all of the above are incorporated by reference herein in their entireties.

FIELD OF THE INVENTION

The present invention relates to mounting assemblies for electrical devices, and more particularly to an L-shaped mounting assembly for securing a device, such as a ceiling fan, light fixture, or similar device to an overhead beam.

BACKGROUND OF THE INVENTION

The present invention expands upon the concept of the prepackaged mounting assembly that is disclosed in and shares inventorship with U.S. Pat. Nos. 6,509,524, 6,632,998, 6,646,201, and 6,677,523. The prepackaged mounting assemblies disclosed in these patents provide all the hardware needed for attaching a mounting assembly to an overhead beam, including all required fasteners to complete the installation, without the need for an outer wrap or separate packaging to hold the separate components.

In particular, U.S. Pat. No. 6,646,201 provided an L-shaped mounting assembly that provided a large integral internal wiring cavity and also disclosed the use of an initial fastener for use in initially securing the mounting assembly to an overhead beam. By securing with the initial fastener, the installer's hands are advantageously freed to complete the remaining installation steps. Load bearing fasteners, which were held in temporary storage receptacles for shipment and storage, were then removed and driven into permanent receptacles and into the supporting beam to securely attach the L-shaped assembly thereto.

U.S. Pat. No. 6,646,201 included an alternate embodiment of the L-shaped mounting assembly, which was to be preferred when there was no provision in the mounting assembly for apertures for receipt of the load bearing fasteners or when the manufacturer's bracket included apertures extending beyond the side walls of the mounting assembly. This mounting assembly is installed initially with an initial mounting screw. The load bearing fasteners are then removed from their temporary storage receptacles and installed through the manufacturer's bracket and directly into the overhead beam to secure the assembly thereto. The load bearing fasteners are thereby installed outboard of the side walls of the lower junction box of the L-shaped mounting assembly and extend directly into the overhead beam. By moving the installation point of the load bearing fasteners outboard the side walls of the lower junction box, the alternate embodiment of the L-shaped mounting assembly could be used with virtually any oversized bracket provided separately by manufacturer's, including those for light fixtures, ceiling fans, or similar overhead electrical devices.

Although the alternate embodiment disclosed in U.S. Pat. No. 6,646,201 enabled the L-shaped mounting assembly to accommodate an oversize manufacturer's bracket, it was difficult to align the bracket with the mounting assembly and the beam to which it was attached.

Accordingly, what is needed is an L-shaped mounting assembly that provides an arrangement for aligning a manufacturer's bracket for proper installation of load bearing fasteners into the supporting beam. The mounting assembly should also provide a large cavity for wiring connections. The mounting assembly should furthermore have the advantage of providing a mounting structure that is capable of being stored, shipped, and sold as a prepackaged unit with all covers and fasteners required for installation self-contained within the unit. The mounting assembly should further have the advantage of holding the cover and fasteners securely enough to permit storage, shipping, display and handling without the need for an outer wrap or separate packaging to retain the cover and fasteners with the assembly.

SUMMARY OF THE INVENTION

According to the present invention, there is provided a mounting assembly for securing a device, such as a ceiling fan, light fixture, or similar device to an overhead beam. The mounting assembly includes an L-shaped mounting box that includes a large side wiring cavity and an integral flange portion. A cover cooperates with the integral flange portion to provide a closure for the wiring cavity and a bottom flange for mounting a manufacturer's bracket thereon. The integral flange portion includes downward extending alignment posts to enable easy centering of the manufacturer's bracket. The bracket typically includes slots therein and the mounting assembly includes all hardware required to complete installation of the device including the cover, an initial fastener, and load bearing fasteners, which are all temporarily secured to the L-shaped box.

At the installation site, the cover may be removed temporarily and the initial fastener used to secure the box to an overhead beam. Wiring connections are then completed in the wiring cavity and the cover reinstalled. After being reinstalled on the mounting box, the cover protects the wiring connections from application of sheet rock, spackle, and paint around the fixture. The manufacturer's bracket is easily centered with the mounting box by slipping the bracket onto the alignment posts with the posts extending through the slots of the bracket. The load bearing fasteners are removed from their temporary storage holsters and installed through the bracket and into the overhead beam to secure the bracket to the beam.

TABLE OF NOMENCLATURE

The following is a listing of part numbers used in the drawings along with a brief description.

| Part Number | Description |
| --- | --- |
| 20 | prepackaged mounting assembly |
| 22 | first junction box |
| 24 | second junction box |
| 26 | side walls of first junction box |
| 28 | top of second junction box |
| 30 | first side of first junction box |
| 32 | opposing sides of second junction box |
| 34 | distal end |
| 36 | lower surface of top |
| 38 | side walls of second junction box |
| 40 | first arcuate flange |
| 40A | circular flange portion |
| 42 | lower edge of first arcuate flange |
| 44 | cover |
| 46 | second arcuate flange |
| 46A | circular flange portion |
| 48 | lower edge of second arcuate flange |
| 50 | alignment post |
| 52 | holster |
| 54 | tubular projection |
| 56 | inner surface |
| 58 | load bearing fastener |
| 60 | initial fastener |
| 62 | removable wall sections or knockouts |
| 64 | top of first junction box |
| 66 | fitting |
| 68 | boss |
| 70 | interior volume |
| 72 | shallow cavity |
| 74 | deep cavity |
| 76 | wide bore |
| 78 | mouth |
| 80 | narrow bore |
| 82 | plane |

-continued

| Part Number | Description |
| --- | --- |
| 84 | point |
| 86 | top surface |
| 88 | closed slot |
| 90 | open ended slot |
| 92 | cover fasteners |
| 94 | integral ears |
| 96 | beam |
| 98 | bracket |
| 100 | longitudinal slots |
| 102 | seat |

DETAILED DESCRIPTION

The present invention is a prepackaged mounting assembly for mounting a suspended electrical fixture from an overhead beam.

Figure 1:
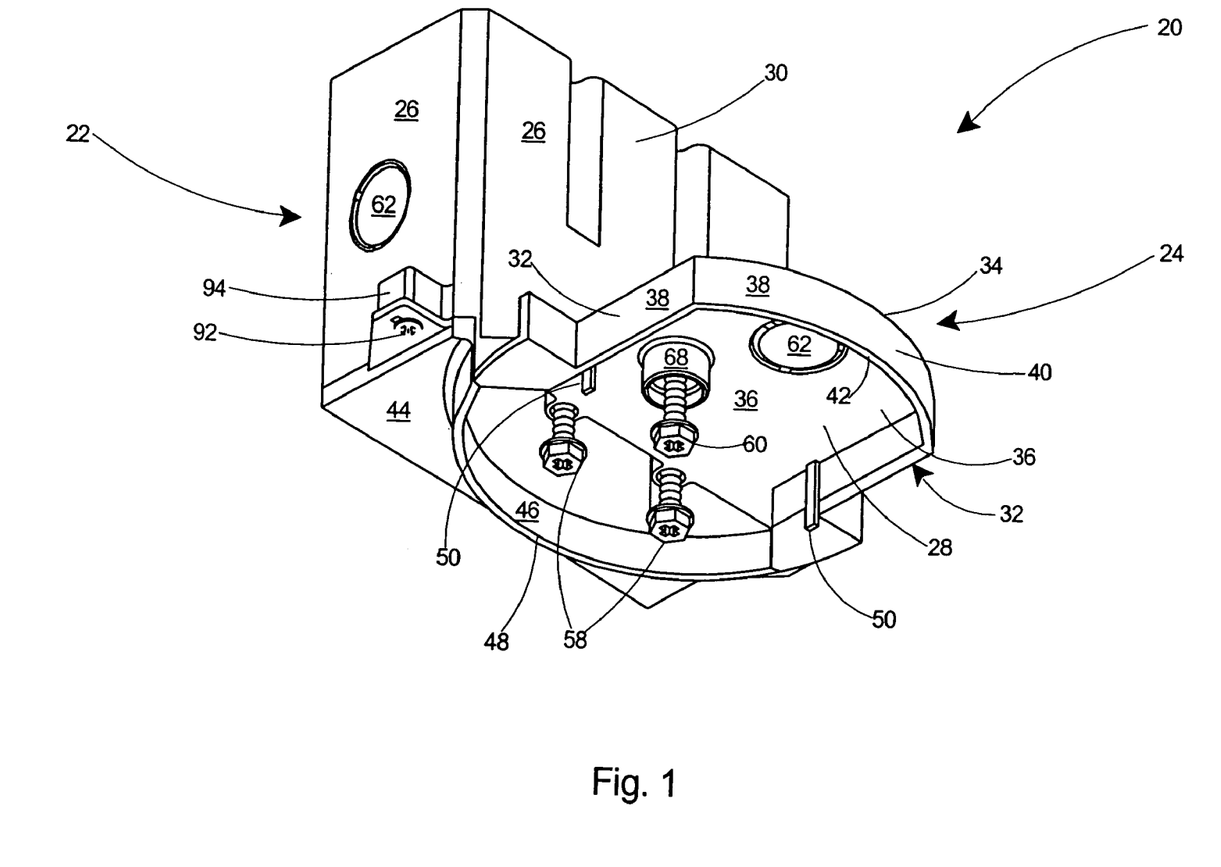
FIG. 1 is a perspective view of the L-shaped mounting assembly of the present invention.

With reference to FIG. 1, a preferred embodiment is shown of the prepackaged mounting assembly 20, which includes a first junction box 22 and a second junction box 24 integrally formed in one piece. The first junction box 22 includes deep side walls 26 that end in a common lower plane. The second junction box 24 includes a top 28 that is integral with and extends orthogonally from a first side 30 of the first junction box 22.

Figure 2:
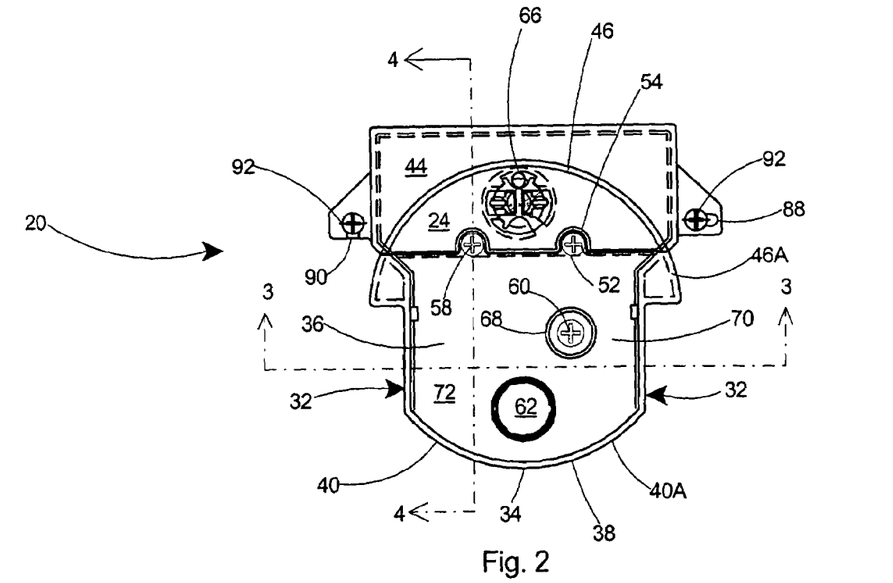
FIG. 2 is a bottom view of the mounting assembly of FIG. 1.

Referring to FIGS. 1 and 2, the top 28 of the second junction box 24 includes two opposing sides 32, a distal end 34, and a lower surface 36. Integral side walls 38 extend downward from the lower surface 36 of the top 28 along the distal end 34 and along the opposing sides 32 of the second junction box 24. The side walls 38 of the second junction box 24 at the distal end 34 form a first arcuate flange 40 having a lower edge 42 ending in a common plane with the side walls 38 of the opposing sides 32. A cover 44 is secured to the deep side walls 26 of the first junction box 22. A second arcuate flange 46 projects from the cover 44 and includes a lower edge 48. With the cover 44 secured to the side walls 26 of the first junction box 22, the lower edge 42 of the first arcuate flange 40 is coplanar with the lower edge 48 of the second arcuate flange 46. Two alignment posts 50 extend downward from the side walls 38 of the second junction box 24 at each of the opposing sides 32.

Figure 3:
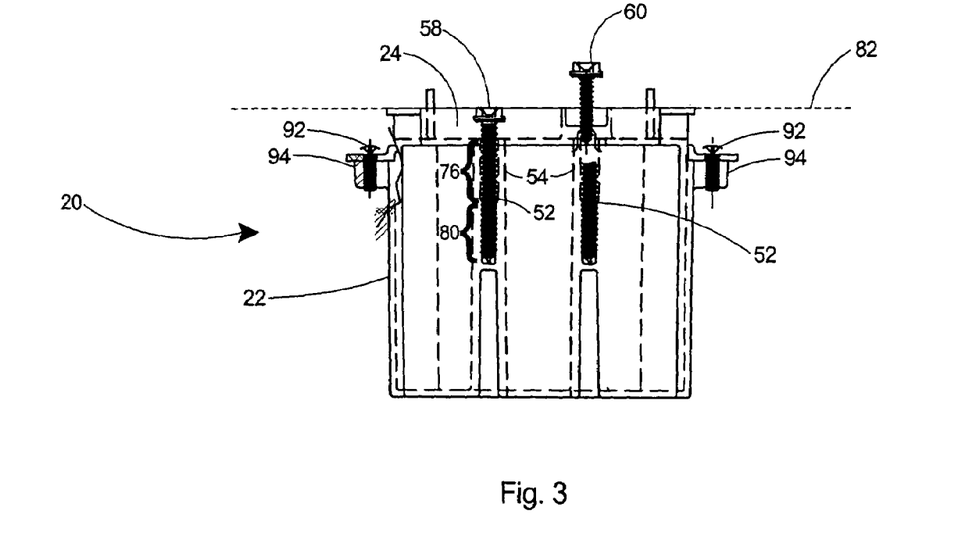
FIG. 3 is a conceptual sectional view of the mounting assembly taken along line 3—3 of FIG. 2 and omitting the mounting box walls to show the relative positions of the initial fastener and load bearing fasteners in the mounting assembly.

With reference to FIGS. 1–3, the prepackaged mounting assembly 20 includes two holsters 52 consisting of tubular projections 54 integral with the inner surface 56 of the first side 30 of the first junction box 22. Each holster 52 includes a load bearing fastener 58 frictionally engaged therein for temporary storage with said prepackaged mounting assembly 20 prior to installation. The prepackaged mounting assembly also includes an initial fastener 60 frictionally engaged in the top 28 of the second junction box 24. One or more removable wall sections 62 or knockouts may be included in either the side walls 26 or top 64 of the first junction box 22 or in the top 28 of the second junction box 24. A snap in fitting such as the Black Button™ available from Arlington Industries, Inc., 1 Stauffer Industrial Place, Scranton, Pa., may be inserted in one or more of the knockouts 62 such as the fitting 66 shown in the top 64 of the first junction box 22 in FIG. 2. As should be readily discernible from the bottom view in FIG. 2 of the prepackaged mounting assembly 20, with the cover 44 installed on the first junction box 22 as shown, the load bearing fasteners 58 and the initial fastener 60 are easily accessible from the bottom of the mounting assembly 20 as the tubular projections 54 which hold the load bearing fasteners 58 and the boss 68 which holds the initial fastener 60 are positioned well within the side walls 26 of the first junction box 22 and the side walls 38 of the second junction box 24. The first arcuate flange 40 and second arcuate flange 46 cooperate to form opposing circular flange portions 40A and 46A. The opposing circular flange portions 40A and 46A and the side walls 38 of the second junction box 24 define an interior volume 70 therein. The interior volume 70 includes the shallow internal cavity 72 of the second junction box 24 and the deep cavity 74 of the first junction box 22.

Figure 4:
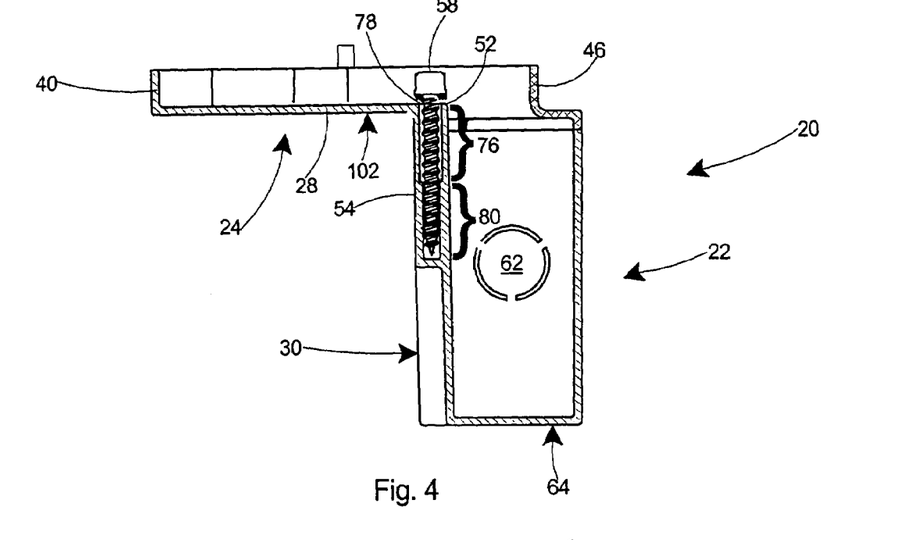
FIG. 4 is a sectional view of the mounting assembly taken along line 4—4 of FIG. 2.

Referring to FIGS. 3 and 4, the load bearing fasteners 58 are held in their temporary storage positions in the holsters 52. The holsters 52 consist of tubular projections 54 integral with the inner walls of the first junction box 22. The tubular projections 54 include a wide bore 76 at the mouth 78 and a narrow bore 80 further within. The wide bore 76 is larger than the major thread diameter of the load bearing fastener 58, the narrow bore 80 is smaller than the major thread diameter, and both bores include smooth interior walls. Threads are formed by the load bearing fastener 58 in the narrow bore 80 portion of the tubular projections 54 as the load bearing fasteners 58 are axially advanced therein. After being threaded into the holsters 52, the load bearing fasteners 58 are held securely therein for shipment and storage and are easily accessible and removable when required at installation. As shown in FIG. 3, the load bearing fasteners 58 in temporary storage in the holsters 52 do not extend beyond a plane 82 connecting the coplanar arcuate flanges 40 and 46.

Figure 6:
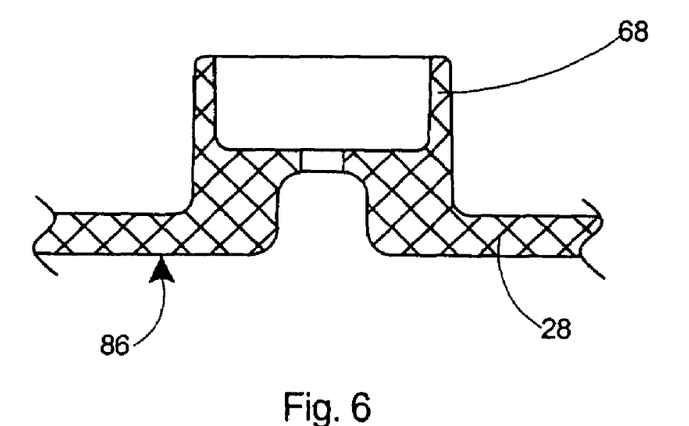
FIG. 6 is a boss detail.
Figure 7:
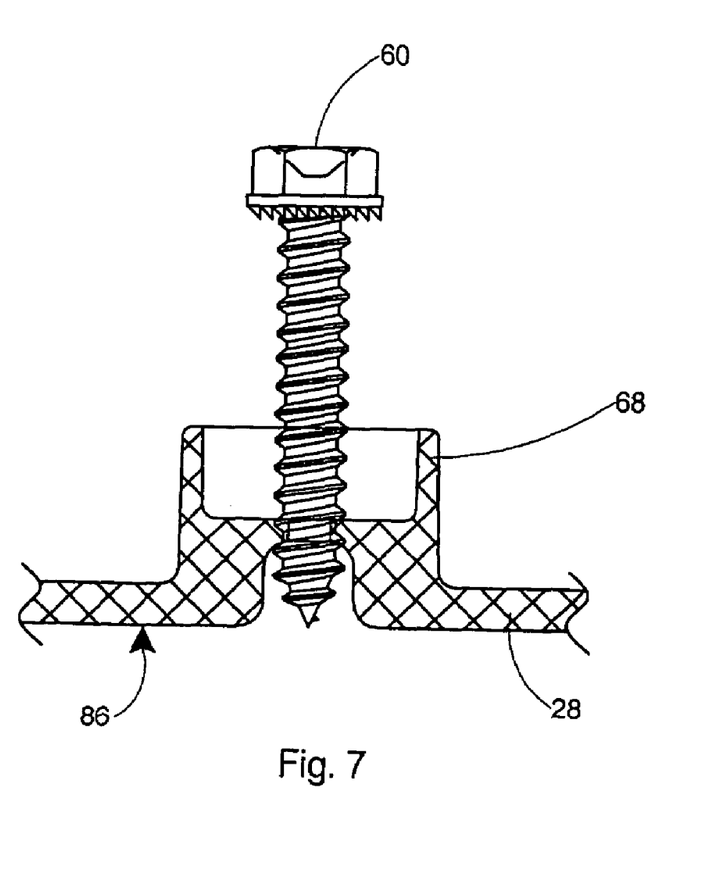
FIG. 7 is a boss detail including an initial mounting fastener.

The initial fastener 60 is securely held in its boss 68 for shipment and storage. As shown in FIGS. 6 and 7, the boss 68 is integral with the top 28 of the second junction box and with the initial fastener 60 inserted therein for shipment and storage, such as shown in FIG. 7, the point 84 of the initial fastener 60 does not extend beyond the top surface 86 of the top 28.

Figure 5A:
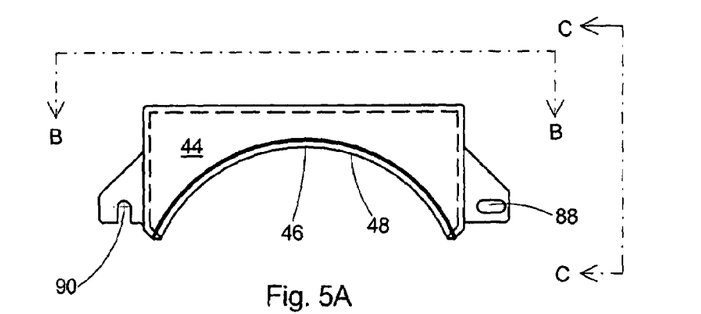
FIG. 5A is a top view of a cover which forms a portion of the mounting assembly of FIG. 1.
Figure 5B:
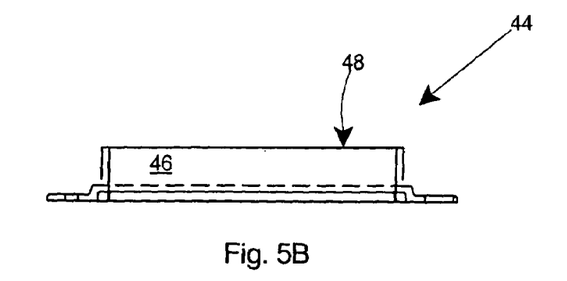
FIG. 5B is a side view of the cover taken along line B—B of FIG. 5A.
Figure 5C:
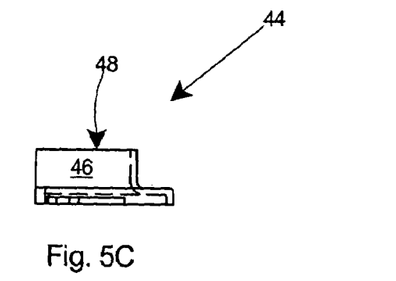
FIG. 5C is an end view of the cover taken along line C—C of FIG. 5A.

With reference to FIGS. 5A–5C, the cover 44 includes a closed slot 88 on one end and an open ended slot 90 on the opposite end. This feature further facilitates ease of installation of the prepackaged mounting assembly 20 as the cover fasteners 92, depicted in FIG. 3, can be loosened slightly allowing the cover 44 be rotated away from the mounting assembly 20. The installation task is therefore made easier for the installer by allowing the cover 44 to be simply rotated away from the mounting assembly 20 to allow access to the interior of the first junction box 22 and then rotated back into place. The second arcuate flange 46 extends downward from the cover 44 and includes a lower edge 48 as shown in FIGS. 5B and 5C. As shown in FIG. 3, integral ears 94 are included on the first junction box 22 for receipt of cover fasteners 92.

Figure 8:
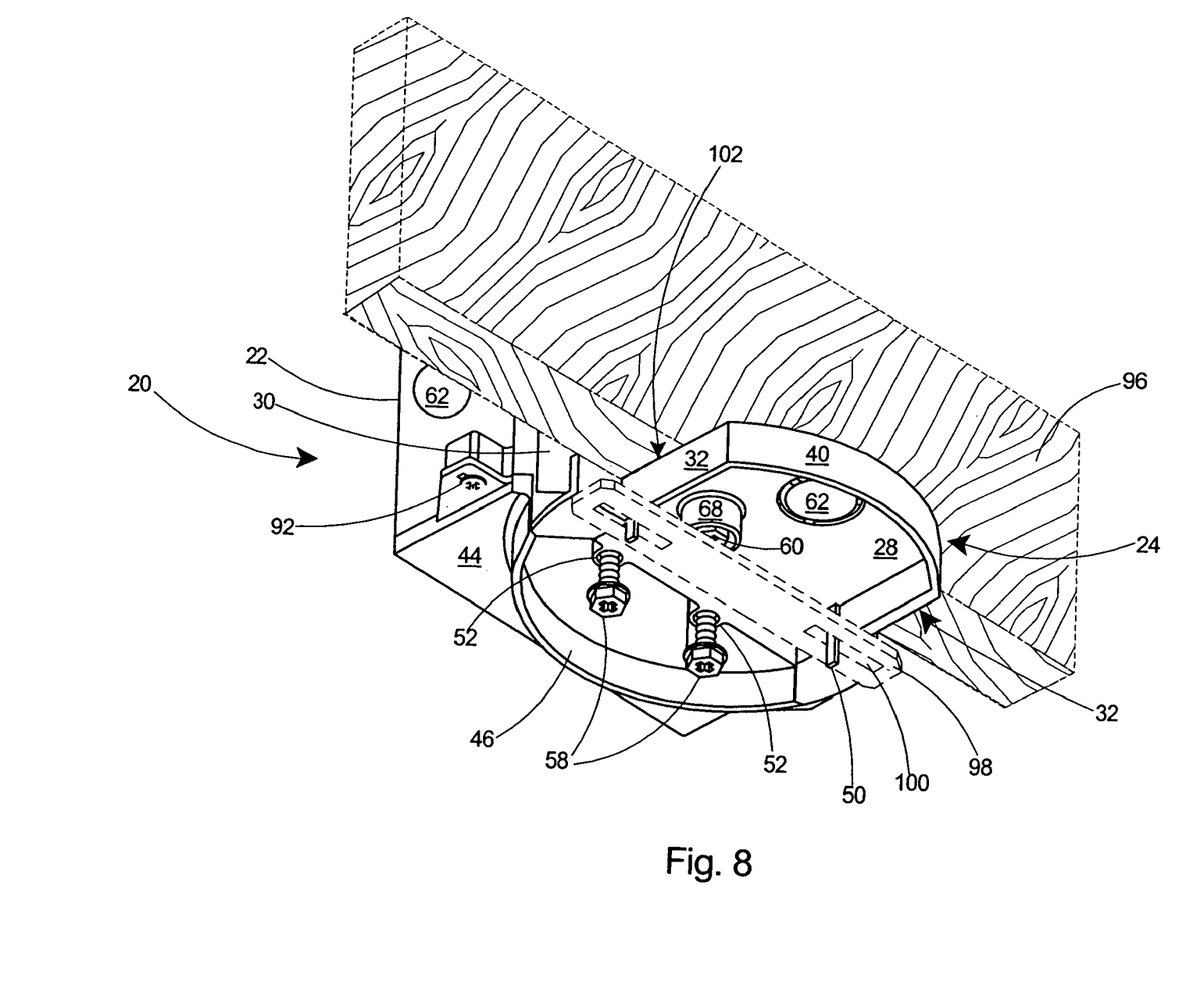
FIG. 8 is a perspective view of the mounting assembly of FIG. 1 after it has been initially mounted on a support beam by an initial mounting fastener and with the load bearing fasteners seated in their holsters.

With reference to FIGS. 4 and 8, it should be noted that the top 28 of the second junction box 24, being orthogonal to the first side 30 of the fist junction box 22, forms a seat 102 thereon for flush placement against an overhead beam 96.

Figure 9:
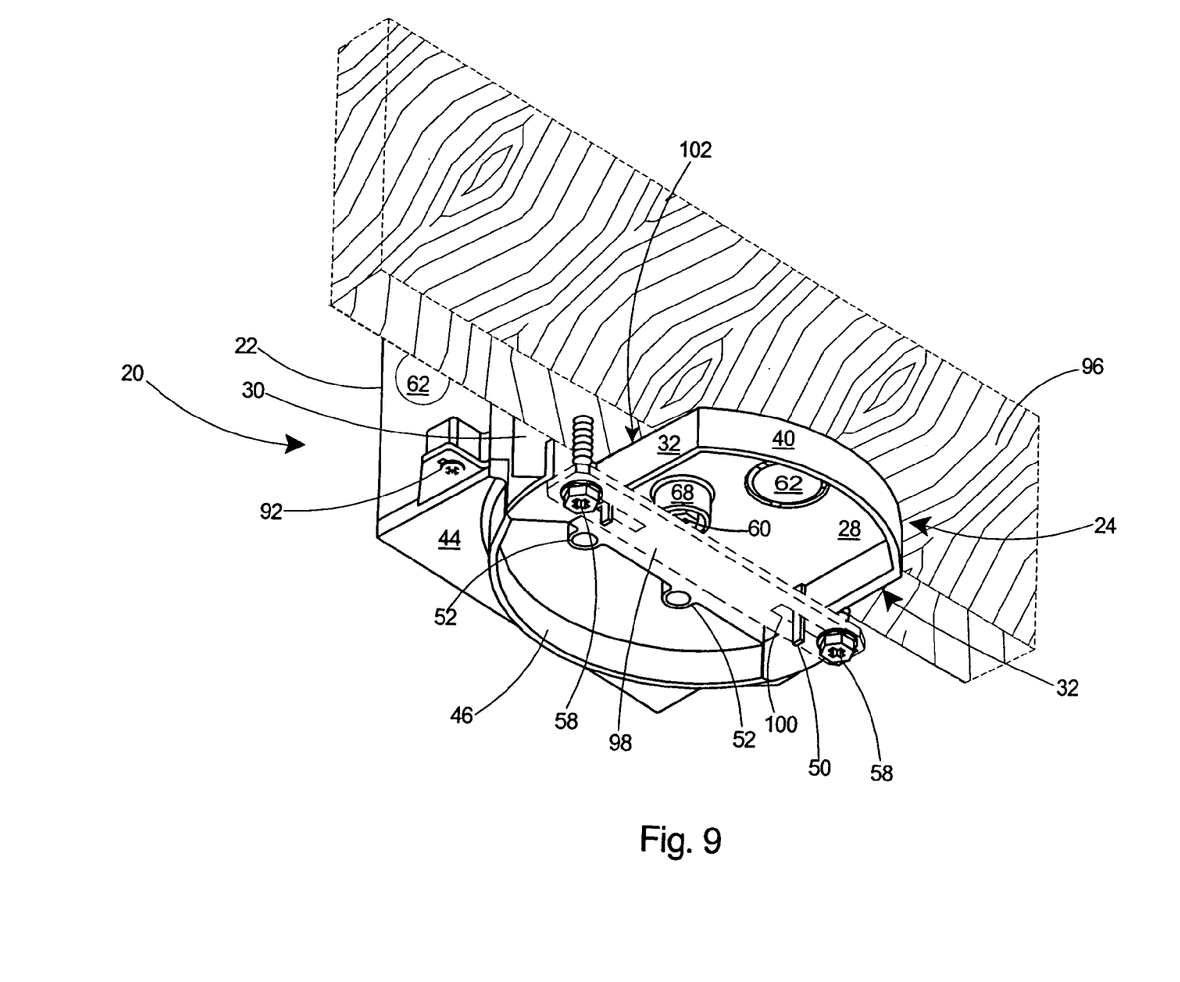
FIG. 9 is a perspective view of the mounting assembly of FIG. 1 after being secured to a support beam by load bearing fasteners driven through the manufacturer's bracket.

For operation of the prepackaged mounting assembly 20, the reader is referred to FIGS. 8 and 9. FIG. 8 depicts the prepackaged mounting assembly 20 placed against the beam 96 with the load bearing fasteners 58 held securely in the holsters 52 for shipment and storage. As shown in FIG. 8, the prepackaged mounting assembly 20 is placed against the beam 96 such that the seat 102 including the first side 30 and top 28 are flush against the beam 96. The initial fastener 60 is then driven into the beam 96 thereby securing the prepackaged mounting assembly 20 to the beam 96. It should be noted that the purpose of the initial fastener 60 is to hold the mounting assembly 20 in place thereby freeing the installer's hands. The bracket 98, which is typically supplied with the electrical fixture by the manufacturer, is then lifted upwards until the longitudinal slots 100 are fitted upon the alignment posts 50. It should be noted that the alignment posts 50 have a width less than that of the longitudinal slots 100. Preferably the alignment posts 50 are between 0.15 and 0.20 inch in width and even more preferably 0.18 inch in width. The alignment posts 50 are preferably between 2.6 and 3.5 inches apart measured between their outer sides and most preferably are 3.11 inches apart. These critical dimensions of the alignment posts 50 permit them to accommodate a wide range of brackets commonly supplied by manufacturers with their electrical devices.

The load bearing fasteners 58 are then removed from their temporary storage positions in the holsters 52, as shown in FIG. 8, and placed through the longitudinal slots 100 of the bracket 98 and driven into the overhead beam 96 as depicted in FIG. 9. to securely fasten the bracket 98 and prepackaged mounting assembly 20 to the overhead beam 96. It should be noted that the alignment posts 50 and second junction box 24 are of a size to position the load bearing fasteners 58 outside of the opposing sides 32 of the second junction box 24. This insures that all of the weight of the fixture (not shown) that will be suspended from the bracket, is supported by the beam 96 and not by the prepackaged mounting assembly 20.

After the prepackaged mounting assembly 20 is secured to the beam 96 by the load bearing fasteners 58 as shown in FIG. 9, the installer can then loosen the cover fasteners 92 and rotate the cover 44 away from the first junction box 22, complete wiring connections between the supply and fixture (not shown), rotate the cover 44 closed upon the first junction box 22, and tighten securely with the cover fasteners 92.

The first junction box 22 and second junction box 24 of the prepackaged mounting assembly of the present invention are preferably molded in one piece from plastic. An especially preferred material of construction is polycarbonate, although they could be molded of other elastomeric materials.

The prepackaged mounting assembly of the present invention provides flexibility by supporting a wide range of fixtures of the type that include a mounting bracket. The prepackaged mounting assembly further provides the advantage that all of the required hardware for mounting the electrical fixture is included with the assembly. The possibility of mistakes from using a fastener that is inadequate for supporting the intended load is thereby minimized. By including all the fasteners temporarily secured in storage locations within the assembly, the prepackaged mounting assembly minimizes the chance of an installer will lose a critical fastener. By freeing the installer's hands, there is much less chance of a fastener being dropped. By locating the load bearing fasteners inside the interior volume of the assembly for shipment and storage, the fasteners are thereby protected during shipment and storage and facilitate ease of packaging. Inclusion of the alignment posts provides an arrangement for quickly aligning a manufacturer's bracket for proper installation of load bearing fasteners into the supporting beam. The prepackaged mounting assembly furthermore provides a large cavity for wiring connections. The prepackaged mounting assembly of the present invention provides the advantage of holding the cover and fasteners securely enough to permit storage, shipping, display, and handling without the need for an outer wrap or separate packaging to retain the cover and fasteners with the assembly.

As the invention has been described, it will be apparent to those skilled in the art that the same may be varied in many ways without departing from the spirit and scope of the invention. Any and all such modifications are intended to included within the scope of the appended claims.

What is claimed is:

1. A prepackaged mounting assembly for use with a separately supplied bracket having openings therein, said prepackaged mounting assembly comprising:
   A) a first junction box having deep side walls ending in a common lower plane;
   B) a second junction box having a top integral with and extending generally orthogonally from a first side of said first junction box;
   C) said top having a side, a distal end, and a lower surface;
   D) said second junction box including an integral side wall extending downward from said lower surface of said top along said distal end and along said side;
   E) said side walls of said second junction box at said distal end forming a first arcuate flange;
   F) said first arcuate flange and said side of said second junction box having a lower edge ending in a common plane;
   G) a cover secured to said deep side walls of said first junction box;
   H) a second arcuate flange projecting from said cover to a lower edge; and
   I) said lower edge of said second arcuate flange coplanar with said lower edge of said first arcuate flange.

* * * * *